(12) United States Patent
Wakazono

(10) Patent No.: US 9,506,840 B2
(45) Date of Patent: Nov. 29, 2016

(54) MARKING DEVICE FOR USE WITH A TIRE TESTING MACHINE

(71) Applicant: Kobe Steel, Ltd., Hyogo (JP)

(72) Inventor: Takehiko Wakazono, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 169 days.

(21) Appl. No.: 14/275,091

(22) Filed: May 12, 2014

(65) Prior Publication Data

US 2015/0000391 A1   Jan. 1, 2015

(30) Foreign Application Priority Data

Jun. 27, 2013   (JP) .................... 2013-134528

(51) Int. Cl.
*G01M 17/02* (2006.01)

(52) U.S. Cl.
CPC .................. *G01M 17/024* (2013.01)

(58) Field of Classification Search
None
See application file for complete search history.

(56) References Cited

U.S. PATENT DOCUMENTS

| | | | |
|---|---|---|---|
| 4,727,419 A * | 2/1988 | Yamada | G06K 9/209 382/141 |
| 5,901,198 A | 5/1999 | Crawford et al. | |
| 5,949,842 A | 9/1999 | Schafer et al. | |
| 5,970,113 A | 10/1999 | Crawford et al. | |
| 6,256,404 B1 | 7/2001 | Gordon et al. | |
| 6,417,918 B1 * | 7/2002 | Anno | G01M 1/02 356/237.1 |
| 6,439,042 B1 * | 8/2002 | Delmoro | G01M 17/024 73/146 |
| 2006/0161381 A1 * | 7/2006 | Jetter | B29D 30/0061 702/155 |
| 2011/0034108 A1 * | 2/2011 | Poling, Sr. | B24B 1/00 451/5 |
| 2013/0333615 A1 | 12/2013 | Wakazono et al. | |
| 2013/0335502 A1 | 12/2013 | Wakazono | |

FOREIGN PATENT DOCUMENTS

| | | |
|---|---|---|
| CN | 2935109 Y | 8/2007 |
| JP | 2000-329658 A | 11/2000 |
| JP | 2001-520376 A | 10/2001 |
| JP | 2006-095738 A | 4/2006 |
| JP | 2012-220319 | 11/2012 |
| TW | 201245681 A | 11/2012 |
| TW | 201245682 A | 11/2012 |
| WO | 2012/117716 A1 | 9/2012 |

* cited by examiner

*Primary Examiner* — Andre Allen
(74) *Attorney, Agent, or Firm* — Studebaker & Brackett PC

(57) ABSTRACT

A marking device of the present invention includes a sequence of two belt conveyers for conveying a tire after undergoing a test by a tire testing machine, a pair of laser sensors each installed in a predetermined position in a conveyance direction of the tire by the belt conveyer, and adapted to detect an edge of the tire, and a controller for controlling a motor for driving the belt conveyer based on an output from the laser sensor. The controller is operable to convey the tire by a conveyance distance calculated based on a distance from an installing position of the laser sensor to a print position, an outer diameter of the tire and a predetermined mark position when the edge of the tire is detected by the laser sensor, and then to stop the tire, whereby the mark position of the tire is aligned with the print position.

7 Claims, 6 Drawing Sheets

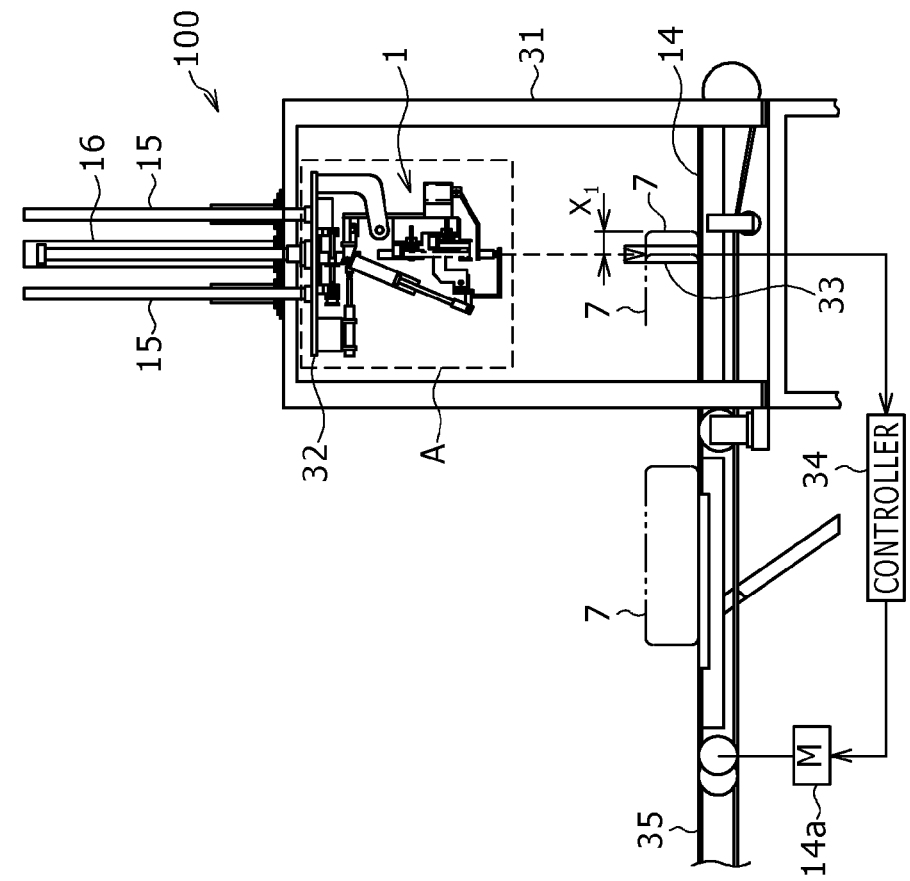
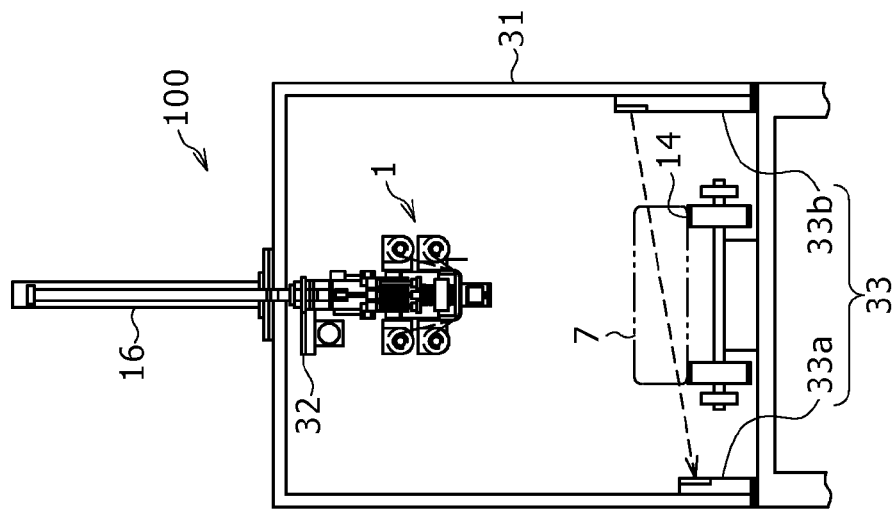

MARKING DEVICE FOR USE WITH A TIRE TESTING MACHINE

BACKGROUND OF THE INVENTION

Field of the Invention

The present invention relates to a marking device in a tire testing machine for testing tires.

Description of the Related Art

When tires mounted on a vehicle or the like are nonuniform in elasticity, size, or shape in its circumferential direction, the above nonuniform part might cause vibration in rotation at high speed, thus decreasing traveling performance. For this reason, tires undergo performance tests by being examined for circumferential uniformity by means of a tire testing machine after vulcanizing and molding step.

The tires obtained after the performance tests by the tire testing machine are subjected to marking by a marking device. The marking device performs marking by pushing a heated marking pin against a thermal transfer tape, and pressing the tape against the tire to print a desired mark on the tire by the thermal transfer.

For example, JP 2000-329658 A discloses a marking device which is designed to print two markings on a tire. The marking involves arranging two tapes adjacent to each other in a substantially circumferential direction (tangential direction) of the tire, and assigning different marking pins to the respective two tapes. The above-mentioned marking device can print the marks in different colors by using two different colored tapes. Further, JP 2006-95738 A discloses a marking device including two tapes arranged in parallel in a radial direction of a tire. This marking device can mark the same type of tire on its same position while switching between the tapes for use without adjusting the position of the tire in the circumferential direction.

In printing a mark in a predetermined mark position of the tire (for example, a side surface of the tire), such marking devices print the mark in the mark position of the tire by transferring the tire by a tire conveyance device (for example, a belt conveyer) to a predetermined print position where the marking device can mark the tire, and adjusting relative positions of the tire and the marking device according to the conveyance distance.

The tires after undergoing the tests by the tire testing machine are conveyed to the marking device via a sequence of a plurality of tire conveyance devices. However, a stepped portion and the like existing on a connected part between the tire conveyance devices might cause the tire, for example, to slip during the conveyance process, displacing the position of the tire on the tire conveyance device. Such displacement of the position of the tire on the tire conveyance device makes the conveyance distance of the tire conveyance device unstable, thus destabilizing the accuracy of printing on the mark position of the tire which is repeatedly performed by the marking device. Further, in recent years, the design of tires (in particular, side surface of the tire) has been complicated, which restricts the mark position of the tire that can assure stable printing of a mark. Thus, the marking device is required to have a function of being capable of repeatedly printing a mark in a mark position of interest of the tire with high accuracy.

Accordingly, in order to solve the above problems, the present invention has been made, and it is an object of the present invention to provide a marking device in a tire testing machine for testing a tire that can repeatedly print a mark in a predetermined mark position of the tire with high accuracy. Specifically, the marking is performed by conveying the tire after undergoing the test by the tire testing machine for the tire test, to the marking device by means of a sequence of a plurality of tire conveyance devices, and then by accurately aligning and stopping the tire in a predetermined print position upon marking the tire by the marking device.

SUMMARY OF THE INVENTION

In order to solve the foregoing problems, a marking device according to one aspect of the present invention is installed side by side with respect to a tire testing machine for testing a tire, the marking device including a marking head for printing a mark in a mark position on the tire after undergoing the test by the tire testing machine, the mark being based on a result of the test performed by the tire testing machine, a sequence of a plurality of tire conveyance devices for conveying the tire after undergoing the test by the tire testing machine to the marking head, a tire detector installed in a position in a width direction of the tire perpendicular to a conveyance direction of the tire by the sequence of the tire conveyance devices so as not to interrupt the tire, the tire detector being adapted to detect the tire conveyed to the marking device after the test by the tire testing machine, and a control unit for controlling the sequence of the tire conveyance devices based on a distance from the installing position of the tire detector to a print position and information on the tire in a radial direction in such a manner that the tire is stopped with the mark position aligned with the print position.

Thus, the tire after undergoing the test by the tire testing machine is conveyed from the tire testing machine to the marking head by the sequence of the tire conveyance devices. Therefore, the tire can be stopped by accurately aligning the predetermined print position of the marking device with the predetermined mark position of the tire based on the distance from the installing position of the tire detector to the predetermined print position and the information about the tire in its radial direction without any influence of the displacement of the tire on the tire conveyance device due to the slip or the like of the tire during the conveyance. Further, when marking the tire by the marking device, the mark can be repeatedly printed in the mark position of the tire with high accuracy.

In the marking device of the present invention, the tire detector may be installed at the tire conveyance device passing through the marking head among the sequence of the tire conveyance devices.

Thus, the tire detector is installed at the tire conveyance device passing through the marking head among the sequence of the tire conveyance devices, which can eliminate the influence due to a stepped part between the tire conveyance device not passing through the marking head and the tire conveyance device passing through the marking head (that is, due to a stepped part existing in the connection part between the tire conveyance devices). That is, since the tire detected by the tire detector is conveyed to the predetermined print position on the same tire conveyance device, the tire can be stopped by more accurately aligning the predetermined mark position of the tire with the print position of the marking device.

In the marking device of the present invention, the tire detector may be installed in the print position in the conveyance direction of the tire by the sequence of the tire conveyance devices.

Thus, the tire detector is installed in the print position in the conveyance direction of the tire by the sequence of the tire conveyance devices, which can save the conveyance time required for alignment, thereby shortening a cycle time for the tire test. In this case, before detecting the tire by the tire detector, the conveyance speed of the tire by the sequence of the tire conveyance devices is preferably low. Thus, the tire can more surely be stopped by surely aligning the tire with the predetermined print position while preventing the slip of the tire.

In the marking device of the present invention, the tire detector may be installed in a position on the upstream side with respect to the print position in the conveyance direction of the tire by the sequence of the tire conveyance devices, and the control unit may be operable to decrease the conveyance speed of the tire after the tire detector detects the tire.

Thus, the tire detector is installed on the upstream side with respect to the print position in the conveyance direction of the tire by the sequence of the tire conveyance devices, so that the tire can be detected at an early stage, and its conveyance speed can be gradually decreased. As a result, the tire can surely be stopped by surely aligning the tire with the predetermined print position while preventing the slip of the tire.

In the marking device of the present invention, the tire conveyance device may be a belt conveyer.

The use of the belt conveyer as a tire conveyance device can keep the good contact between the tire and the tire conveyance device, which facilitates the alignment and positioning of the tire with respect to the print position according to the conveyance distance.

In the marking device of the present invention, the tire detector may be a laser sensor.

Thus, the tire detector employs the non-contact laser sensor having a small spot diameter to thereby more accurately detect the tire, enabling the tire to be aligned and positioned with respect to the print position with higher accuracy.

Further, the tire detector may be installed to have a scanning direction thereof forming an angle with respect to a tire conveyance surface.

If the laser sensor has the small spot diameter and its scanning direction horizontal to the tire conveyance surface, the bottom of a groove of the tire might be detected depending on the type of the tire, which leads to inaccurate detection of an edge of the tire. Thus, the laser sensor is installed such that the scanning direction forms an angle with respect to the tire conveyance surface, whereby the edge of the tire can be accurately detected.

The marking device of the present invention is a marking device in the tire testing machine for testing the tire, which can stop the tire after undergoing the test by the tire testing machine for testing the tire by accurately aligning the tire with the predetermined print position upon marking the tire conveyed to the mark position by the sequence of the tire conveyance devices. Thus, the mark can be repeatedly printed in the predetermined mark position of the tire with high accuracy.

BRIEF DESCRIPTION OF THE DRAWINGS

FIG. 1A is a front view of a marking device according to one embodiment of the invention.

FIG. 1B is a side view of the marking device in the one embodiment.

FIGS. 5A, 5B, 5C, and 5D are diagrams showing a marking head included in the marking device in the one embodiment shown in FIG. 1, in which FIG. 5A is a bottom view of the marking head, FIG. 5B is a front view thereof, FIG. 5C is a side view thereof, and FIG. 5D is a side view of a main part B shown in FIG. 5B.

DESCRIPTION OF THE PREFERRED EMBODIMENTS

In the following, preferred embodiments for carrying out a marking device according to the present invention will be described based on one specific example with reference to the accompanying drawings.

The embodiments described below are illustrative only, and are not intended to limit the application of the marking device according to the present invention. That is, the marking device of the present invention is not limited to the following embodiments, and various modifications and changes can be made to those embodiments within the scope of the claims of the invention.

(Structure of Marking Device)

Figure 3:
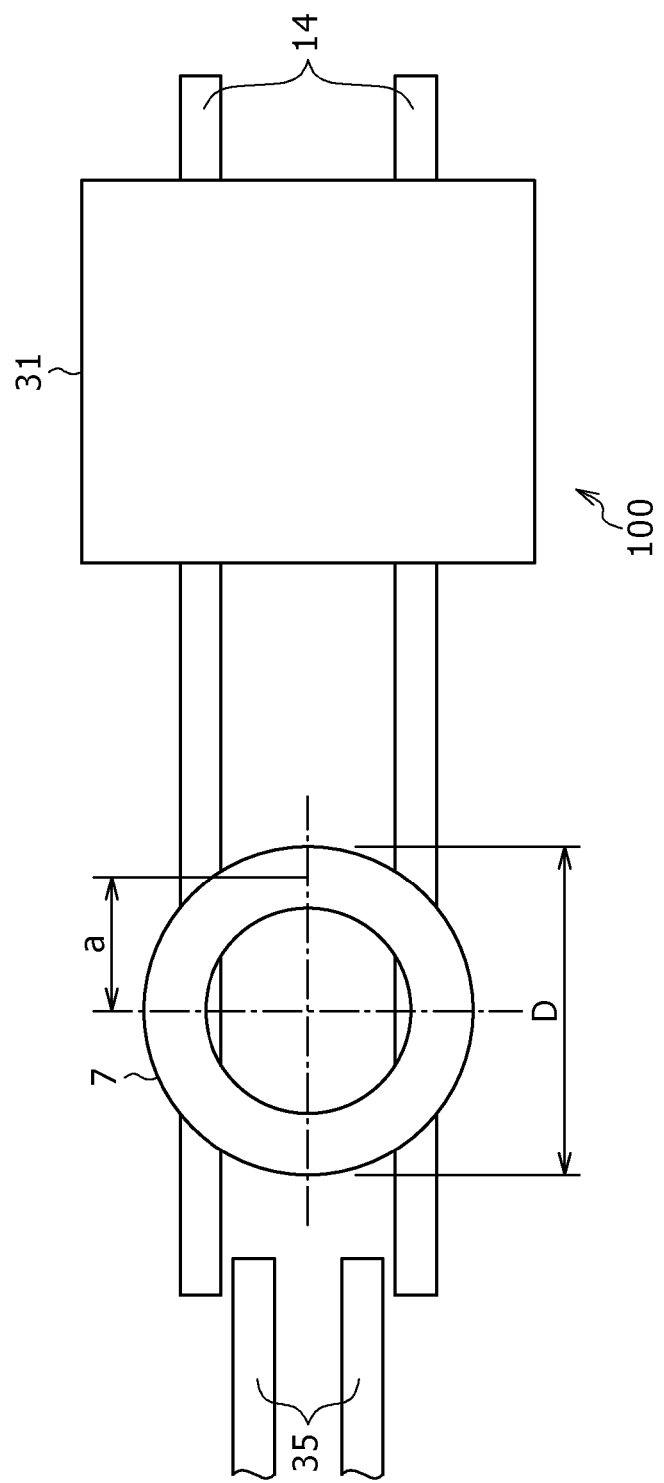
FIG. 3 is a top view showing the marking device in the one embodiment.

First, the structure of a marking device according to one embodiment of the present invention will be described with reference to FIGS. 1 and 3. As shown in FIG. 1, a marking device 100 of the present embodiment includes a sequence of two belt conveyers (tire conveyance devices) 35 and 14 for conveying a tire 7 after undergoing various performance tests by a tire testing machine (not shown), a pair of laser sensors (tire detectors) 33 for detecting an edge of the tire 7 (the tip of the tire 7 on the downstream side in the conveyance direction by the belt conveyer 14), and a controller (control unit) 34 for controlling a motor 14a for driving the belt conveyer 14 based on an output from the laser sensor 33.

The belt conveyer 35 and the belt conveyer 14 are installed such that a downstream end of the belt conveyer 35 (on the right side in FIG. 3) and an upstream end of the belt conveyer 14 (on the left side in FIG. 3) are superimposed over each other in the conveyance direction. The motor 14a for driving the belt conveyer 14 is controlled so as to be in synchronization with a motor (not shown) for driving the belt conveyer 35. In this way, the belt conveyer 35 and the belt conveyer 14 are regarded as a sequence of conveyance devices. The tire 7, after undergoing various performance tests by the tire testing machine (not shown), are fed from the belt conveyer 35 to the belt conveyer 14.

A pair of laser sensors 33 is formed of a reflective plate 33a and a laser radiation portion 33b. The laser sensors 33 are placed in the positions having the width direction perpendicular to the conveyance direction of the tire 7 conveyed by the belt conveyer 14 and passing through the marking device 100, and in the positions not interrupting the tire 7. That is, the reflective plate 33a and the laser radiation portion 33b are positioned on both sides in the width direction perpendicular to the conveyance direction of the tire 7 conveyed by the belt conveyer 14 and passing through the marking device 100 so as to be spaced apart from each other not to interrupt the tire 7 conveyed by the belt conveyer 14. Further, in the marking device 100 of the present embodiment, each of the reflective plate 33a and the laser radiation portion 33b is installed in a predetermined print position of the marking device 100 in the conveyance direction of the tire 7 by the belt conveyer 14. The term "predetermined print position of the marking device 100" as used herein means the position in the conveyance direction of the tire 7 by the belt conveyer 14, and also the position where a vertical direction of a marking head 1 (indicated by a dashed arrow of FIG. 1) included in the marking device 100 intersects a conveyance surface of the tire 7 by the belt conveyer 14.

Figure 2:
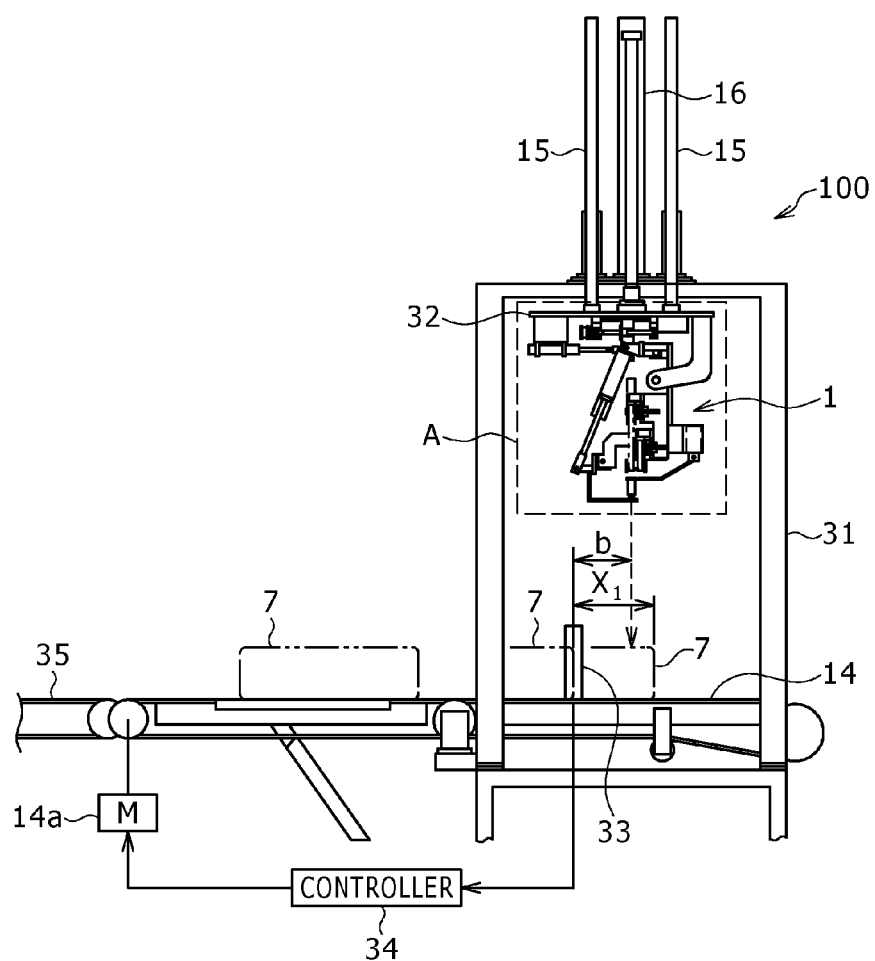
FIG. 2 is a side view showing a modified example of the marking device in the one embodiment.

As shown in a modified example of the marking device 100 of the present embodiment in FIG. 2, the reflective plate 33a and the laser radiation portion 33b may be installed in the position near the predetermined print position (specifically, the position at a distance of b (mm) from the predetermined print position on the upstream side in the conveyance direction) on the upstream side in the conveyance direction with respect to the predetermined print position of the marking device 100 in the conveyance direction of the tire 7 by the belt conveyer 14. In other words, in the marking device 100 of the present embodiment shown in FIG. 1, the distance b between the predetermined print position of the marking device 100 in the conveyance direction of the tire 7 by the belt conveyer 14 and the installing positions of the reflective plate 33a and the laser radiation portion 33b in the conveyance direction of the tire 7 by the belt conveyer 14 is set to 0 (mm).

As shown in FIG. 1A, the pair of laser sensors 33 is installed such that its scanning direction forms some angle with respect to the tire conveyance surface of the belt conveyer 14, thereby detecting the edge of the tire 7 conveyed on the belt conveyer 14. This arrangement can prevent the inaccurate detection of the edge of the tire 7 due to detection of the bottom of a groove depending on the tire 7 performed by the pair of laser sensors 33 with its scanning direction horizontal to the tire conveyance surface.

The controller 34 is connected to the laser sensor 33 and the motor 14a. A signal output from the laser sensor 33 when detecting the tire 7 is input to the controller 34, which can control the driving of the motor 14a. The controller 34 controls the motor 14a for driving the belt conveyer 14 such that the conveyer is stopped by aligning the predetermined mark position of the tire 7 with the predetermined print position of the marking device 100 based on the output from the laser sensor 33, information on the tire 7 in the radial direction previously input, and the distance (b (mm) described above) from the installing position of the laser sensor 33 to the predetermined print position of the marking device 100. The information on the tire in the radial direction is input based on data on the type of the tire 7 which is read by another higher level controller previously included in the marking device 100. The information includes an outer diameter of the tire 7, and the predetermined mark position of the tire 7 (mark position or the like spaced apart from the center in the axial direction of the tire 7 by a predetermined distance in the radial direction).

More specifically, as shown in FIGS. 1B and 2, the controller 34 causes the tire 7 to be conveyed only by the conveyance distance X1 (mm) after detection of the edge of the tire 7 by the laser sensor 33, and then stops the driving of the motor 14a, so that the predetermined mark position of the tire 7 is aligned with the predetermined print position of the marking device 100. Regarding the information on the tire 7 in the radial direction, as shown in FIG. 3, D (mm) is an outer diameter of the tire 7, and a (mm) is a distance from the center in the axial direction of the tire 7 to the predetermined mark position of the tire 7 in the radial direction at sidewalls of the tire 7. As shown in FIGS. 1A and 2, b (mm) is a distance from the laser sensor 33 to the predetermined print position of the marking device 100 (note that b=0 (mm) in FIG. 1B). In that case, the conveyance distance X1 is calculated as follows:

$$X1 = D/2 - a + b$$

Further, in the marking device 100 of the present embodiment shown in FIG. 1, each of the reflective plate 33a and the laser radiation portion 33b is installed in the predetermined print position of the marking device 100 in the conveyance direction of the tire 7 by the belt conveyer 14, so that a value b is 0 (b=0).

In the marking device 100 of the present embodiment shown in FIGS. 1 and 2, each of the pair of laser sensors 33 is disposed in the predetermined print position of the marking device 100 in the conveyance direction of the tire 7 by the belt conveyer 14, or in the vicinity of the predetermined print position on the upstream side in the conveyance direction with respect to the predetermined print position of the marking device 100 in the conveyance direction of the tire 7 by the belt conveyer 14. The conveyance distance X1 conveyed from when the edge of the tire 7 is detected by the pair of laser sensors 33 until when the tire 7 is stopped is relatively short. Preferably, the controller 34 is controlled, for example such that once a sensor installed in a predetermined position on the upstream side with respect to the pair of laser sensors 33 detects that the tire passes through the sensor itself until the tire 7 passes through the pair of laser sensors 33, the belt conveyer 14 is driven at a certain low conveyance speed.

The term "low conveyance speed" as used herein preferably means a speed at which the tire 7 is surely aligned without slip in the case where the tire 7 is delivered by the conveyance distance X1 after detection of the edge of the tire 7 by the pair of laser sensors 33 to be stopped. Thus, the tire 7 can more surely be positioned and stopped in the predetermined print position while preventing the slip of the tire 7. When the belt conveyer 14 is driven at the certain conveyance speed V1 (mm/s) upon detecting the edge of the tire 7 by the pair of laser sensors 33, the conveyance time T1 during which the controller 34 causes the tire 7 to be conveyed by the conveyance distance X1 (mm) after the detection of the edge of the tire 7 by the laser sensors 33 is calculated as follows:

$$T1 = X1/V1$$

(Structure of Marking Head)

As shown in FIG. 1, the marking device 100 of the present embodiment includes the marking head 1 for printing a mark on the tire 7, and an air cylinder 16 for getting the marking head 1 close to the surface of the tire 7.

The sidewalls of the tire 7 are facing upward in lying on the belt conveyer 35. Above the belt conveyer 14 for conveying the tire 7, the marking head 1 supported by a lift frame 32 is disposed opposed to the belt conveyer 14 in the vertical direction.

The air cylinder 16 stands on a frame 31, and acts to lift or lower the lift frame 32, thereby vertically moving the marking head 1 up and down. Guide members 15 for guiding the lifting and lowering of the lift frame 32 are respectively disposed on the frame 31 before and after the air cylinder 16 in the conveyance direction of the tire 7 by the belt conveyer 14.

When printing the mark on the tire 7 located on the belt conveyer 14, under control of the above-mentioned controller 34, the tire 7 on the belt conveyer 14 is conveyed to under the marking head 1, and then stopped with the predetermined mark position of the tire 7 aligned with the predetermined print position. Then, the marking head 1 is moved by the air cylinder 16 close to the surface of the tire 7.

Figure 4:
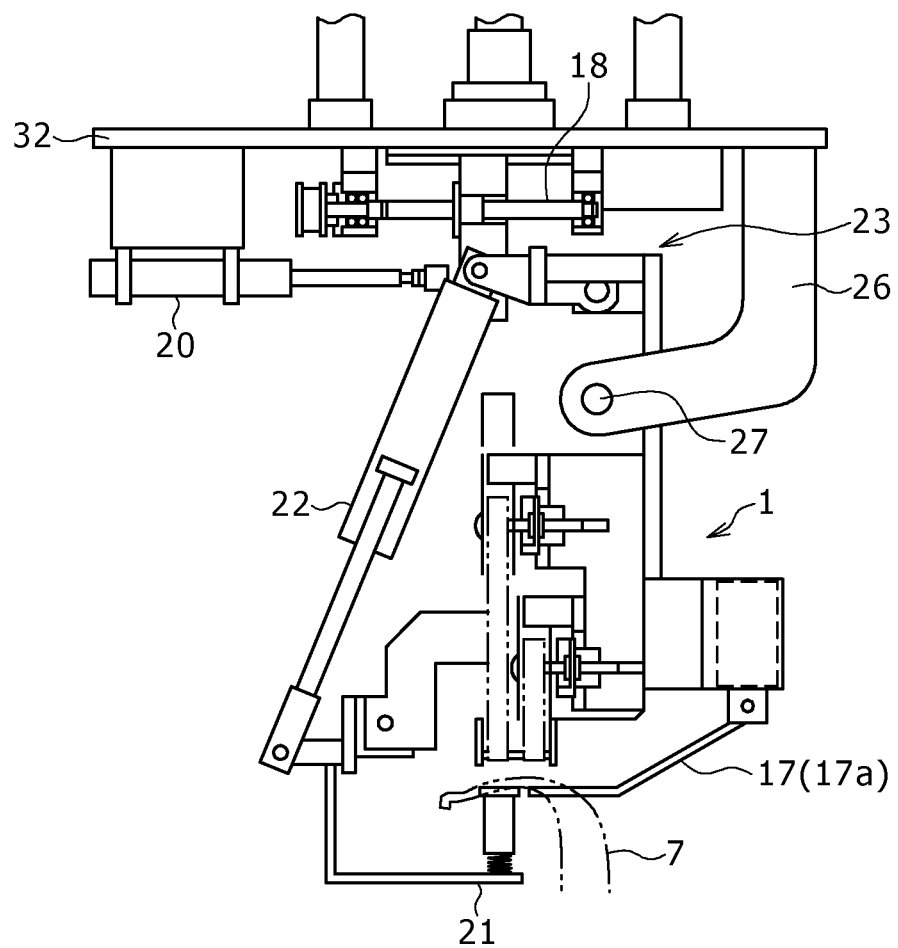
FIG. 4 is an enlarged side view of a marking device (A) in the one embodiment shown in FIG. 1.

The air cylinder 16 is equipped with a braking mechanism so as to be capable of stopping midway of the stroke. The air cylinder 16 is designed to be braked when the tire 7 is brought into contact with a tire contact switch 17 for sensing the contact with the tire 7 located under the marking head 1. As shown in FIG. 4 which is an enlarged view of a main part A shown in FIG. 1B, the tire contact switch 17 includes a stick member 17a, and a limit switch (not shown). When the tip end of the stick member 17a is bought into contact with the tire 7, the limit switch on the base end side is operated. When the limit switch is operated, the air cylinder 16 is braked, thereby producing an appropriate distance between the tire 7 and the marking head 1.

As shown in FIG. 4, the marking head 1 is swingingly attached to a rotary shaft 27 horizontally bridging between a pair of substantially L-shaped support frames 26 and 26 attached to the lift frame 32. An angle adjustment mechanism 23 for swinging the marking head 1 itself and a linear sensor 20 for measuring an angle of the marking head 1 are provided under the lift frame 32. The marking head 1 has its angle adjusted by the angle adjustment mechanism 23 driven by a ball screw 18 and a motor (not shown) for rotating the ball screw 18 so as to have an angle appropriate for printing with respect to the tire 7.

Figure 5A:
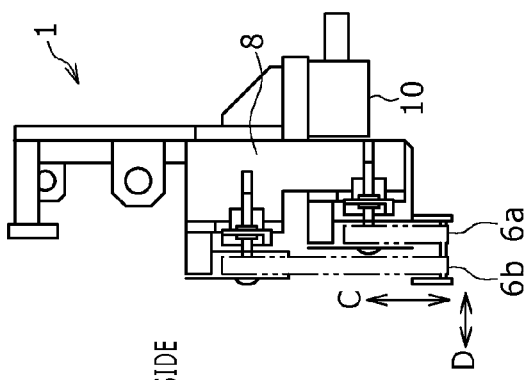
Figure 5C:
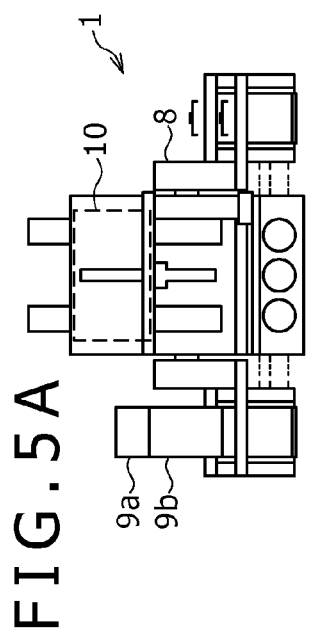
Figure 5B:
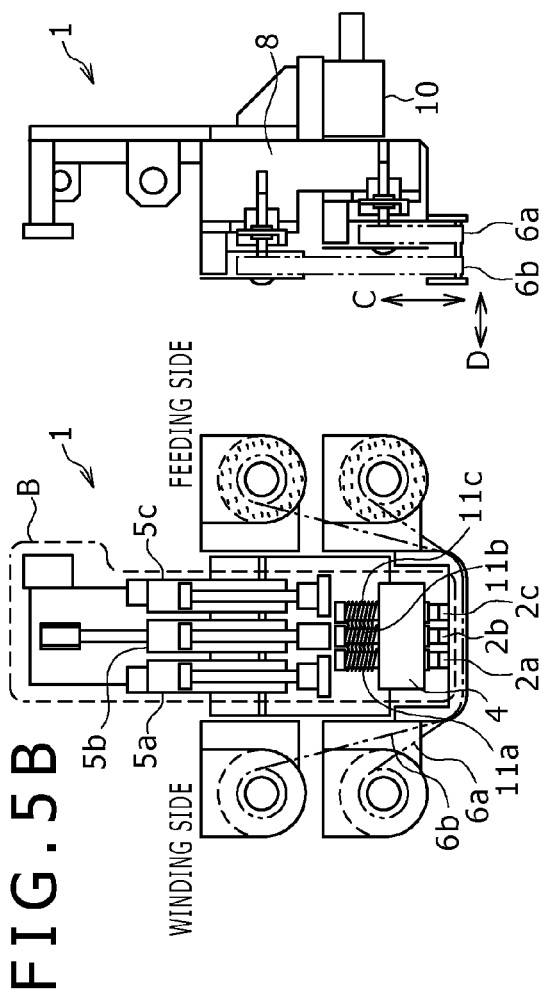
Figure 5D:
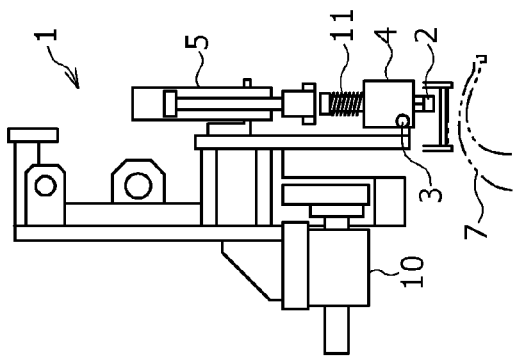

As shown in FIG. 5B, marking pins 2a, 2b, and 2c are installed beneath the marking head 1. Each of the marking pins 2a, 2b, and 2c has its tip formed in a circular or triangle shape or the like according to the shape of a mark to be printed. As shown in FIG. 5D which is a side view of a main part B shown in FIG. 5B, the making pins 2 (2a, 2b, 2c) are inserted into a block 4 whose temperature is adjusted by a heater 3 to an appropriate temperature for thermal transfer tapes 6a and 6b. The marking pins 2a, 2b, 2c are pushed out by air cylinders 5a, 5b, and 5c toward the heat transfer tapes 6a and 6b opposed to the pins, respectively.

As shown in FIGS. 5A and 5C, a support stand 8 supports the two heat transfer tapes 6a and 6b arranged in parallel in a direction D perpendicular to a direction C as a longitudinal direction of the marking pins 2a, 2b, and 2c. Each of the heat transfer tapes 6a and 6b is a tape with ink applied thereto. The ink is to be transferred to a subject of interest by heat. In the present embodiment, the heat transfer tape 6a and the heat transfer tape 6b are different in color. The heat transfer tape 6a is disposed on the air cylinder 10 side (back side) with respect to the heat transfer tape 6b. The support stand 8 is connected to the air cylinder 10. The air cylinder 10 moves the support stand 8 in the direction D, thereby causing any one of the two heat transfer tapes 6a and 6b to be opposed to the marking pins 2a, 2b, and 2c in the direction C.

One of the air cylinders 5a, 5b, and 5c that complies with printing conditions is pushed out to press one of the marking pins 2a, 2b, and 2c against the heat transfer tape 6a or 6b, whereby the printing is performed on the tire 7 aligned on the belt conveyor 14 by the above-mentioned controller 34. After the air cylinder 5a, 5b, or 5c is returned, the marking pin 2a, 2b, or 2c is returned to its original position spaced apart from the heat transfer tape 6a or 6b by a spring 11a, 11b, or 11c attached to the marking pin 2a, 2b, or 2c.

As shown in FIG. 4, the marking head 1 is equipped with a support 21 adapted to push the back side of the tire 7 to thereby prevent the tire 7 from being dented upon pressing the marking pins 2a, 2b, and 2c against the tire 7. The support 21 is configured to be swingable together with the expansion and contraction of an air cylinder 22. The support 21 is adjusted in such a manner that the tip of a rod of the support 21 and the marking pin 2a, 2b, or 2c are opposed to each other with the tire 7 sandwiched therebetween when pressing the marking pin 2a, 2b, or 2c against the tire 7.

As described above, in the marking device 100 of the present embodiment, specifically, the tire 7 after undergoing the tests by the tire testing machine is conveyed from the tire testing machine to the marking device 100 by the sequence of the belt conveyers 35 and 14. Then, the pair of laser sensors 33 is installed in the positions not interrupting the tire 7 in the width direction perpendicular to the conveyance direction of the belt conveyor 14 passing through the marking device 100 among the sequence of the belt conveyers 35 and 14. The tire 7 detected by the pair of laser sensors 33 is adapted to be conveyed on the same belt conveyor 14 to the predetermined print position. Therefore, the tire 7 can be stopped by accurately aligning the predetermined mark position of the tire 7 with the predetermined print position of the marking device 100 based on the distance from the pair of laser sensors 33 to the predetermined print position of the marking device 100 and the information about the tire 7 in the radial direction without any influence of the displacement of the tire 7 on the belt conveyers 35 and 14 due to the slip of the tire during the conveyance. Further, when marking the tire 7 by the marking device 100, the mark can be repeatedly printed in the predetermined mark position of the tire 7 with high accuracy. The marking device can reduce the influence that might be caused by a stepped part formed between the belt conveyor 35 not passing through the marking device 100, and the belt conveyor 14passing through the marking device 100 (due to a stepped part existing between the sequence of the belt conveyers 35 and 14). That is, since the tire 7 detected by the pair of laser sensors 33 is conveyed to the predetermined print position on the same belt conveyor 14, the tire 7 can be stopped by more accurately aligning the predetermined mark position of the tire 7 with the print position of the marking device 100.

Each of the pair of laser sensors 33 is disposed in the predetermined print position of the marking device 100 in the conveyance direction of the tire 7 by the belt conveyor 14, or in the vicinity of the predetermined print position on the upstream side with respect to the predetermined print position of the marking device 100. Thus, the tire 7 is detected directly before the print position, which can save the conveyance time required for the alignment, and can also shorten a cycle time in the tire test.

The use of the belt conveyers 35 and 14 as a tire conveyance device can keep the good contact between the tire 7 and the belt conveyers 35 and 14, which facilitates the alignment and positioning of the tire 7 with respect to the print position according to the conveyance distance.

The tire detector can use the pair of non-contact laser sensors 33 having a small spot diameter to detect the tire 7 more accurately, thereby aligning the tire 7 with the print position with high accuracy.

Although the preferred embodiment of the present invention has been described above, the present invention is not limited to the embodiment, and various modifications and changes can be made to the embodiment within the scope of the claims of the invention.

In the marking device 100 described above, each of the pair of laser sensors 33 is disposed in the predetermined print position of the marking device 100 in the conveyance direction of the tire 7 by the belt conveyor 14, or in the position in the vicinity of the predetermined print position on the upstream side in the conveyance direction with respect to the predetermined print position of the marking device 100 in the conveyance direction of the tire 7 by the belt conveyer 14. However, the position of the sensors 33 is not limited thereto. For example, like a marking device 100 of another embodiment shown in FIG. 6, the pair of laser sensors 33 is disposed on both sides in the width direction perpendicular to the conveyance direction of the tire 7 by the belt conveyer 14 passing through the marking device 100 and in positions spaced apart from each other not to interrupt the tire 7 conveyed by the belt conveyer 14. As long as this arrangement is maintained, the sensors may be installed, for example, in the positions on the upstream side with respect to the marking device 100 in the conveyance direction of the tire 7 by the belt conveyer 14, that is, in the positions spaced apart on the upstream side from the print position by a predetermined distance (c (mm)).

Figure 6:
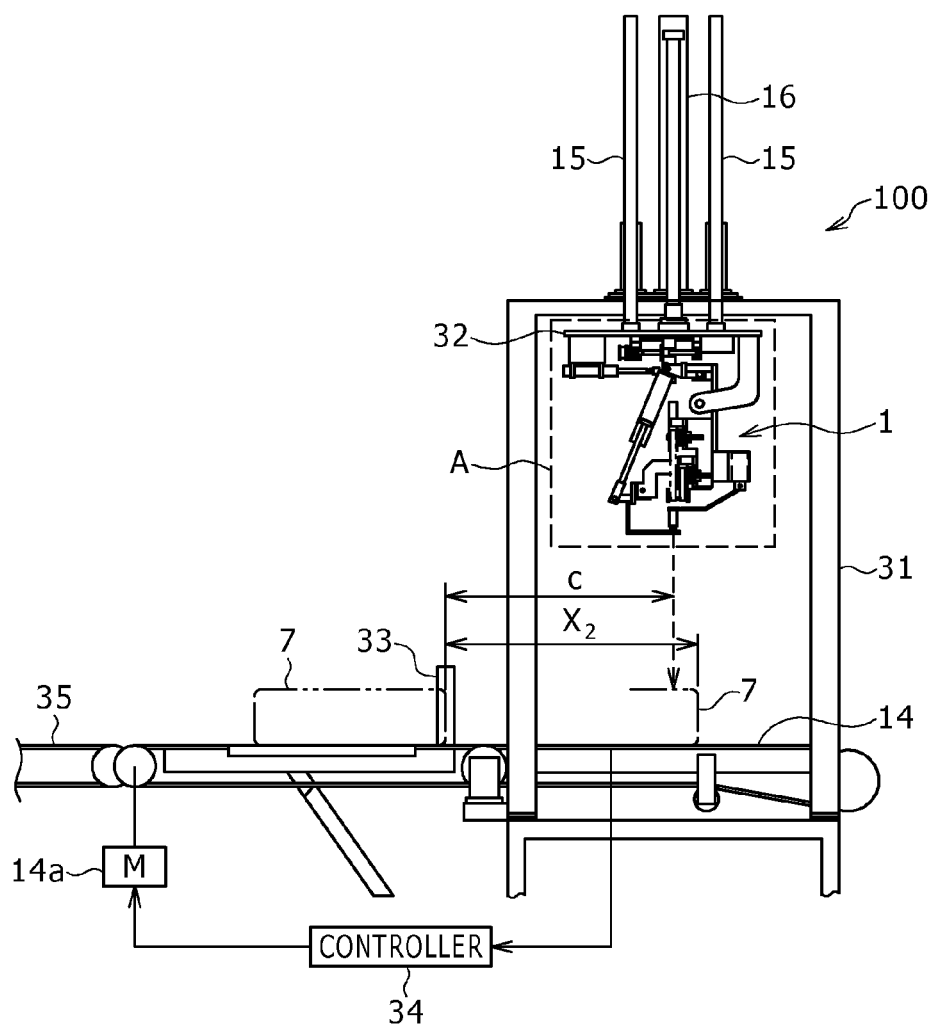
FIG. 6 is a side view showing a marking device according to another embodiment.

In the marking device 100 according to another embodiment shown in FIG. 6, the controller 34 causes the tire 7 to be conveyed only by a conveyance distance X2 (mm) after detection of the edge of the tire 7 by the laser sensor 33, and then stops the driving of the motor 14a, so that the predetermined mark position of the tire 7 is aligned with the predetermined print position of the marking device 100. Regarding the information on the tire in the radial direction, D (mm) is an outer diameter of the tire 7, a (mm) is a distance from the center in the axial direction of the tire 7 to the predetermined mark position of the tire 7 in the radial direction at the side walls of the tire 7, and c (mm) is a distance from the installing position of the laser sensor 33 to the predetermined print position of the marking device 100. In that case, the conveyance distance X2 is calculated as follows:

$$X2 = D/2 - a + c$$

In the marking device 100 of another embodiment shown in FIG. 6, each of the pair of laser sensors 33 is disposed in the position on the upstream side with respect to the predetermined print position of the marking device 100 in the conveyance direction of the tire 7 by the belt conveyer 14, that is, in the position spaced apart on the upstream side from the print position by a predetermined distance. The conveyance distance X2 conveyed until the tire 7 is stopped after the pair of laser sensors 33 detects the edge of the tire 7 is relatively long. Thus, when the tire 7 is moved to pass through the pair of laser sensors 33 at a high conveyance speed of the belt conveyer 14, that is, when the laser sensors 33 detect the tire 7, the controller 34 gradually decreases the conveyance speed of the tire 7 by the belt conveyer 14. Then, the controller 34 is adapted to stop the conveyance of the tire 7 once the tire 7 is conveyed only by the conveyance distance X2 after the laser sensors 33 detect the tire 7. When the conveyance speed is gradually decreased, the speed is preferably decreased to such a degree that the tire 7 does not slip. In this way, the tire 7 is detected at an early stage and then its conveyance speed is gradually decreased, which can prevent the tire 7 from slipping to more surely align and stop the tire at the predetermined print position.

In the marking device 100 of the embodiments described above, the sequence of the two tire conveyance devices for conveying the tire 7 after undergoing various performance tests by the tire testing machine, to the marking device 100 include the belt conveyer 35 and the belt conveyer 14. However, the tire conveyance device is not limited thereto. For example, the tire conveyance device may be a roller conveyer.

In the marking device 100 of the above embodiments, the tire detector for detecting the edge of the tire 7 includes the pair of laser sensors 33, but is not limited thereto. For example, the tire detector can be configured using various other sensors.

What is claimed is:

1. A marking device installed side by side with respect to a tire testing machine for testing a tire, the marking device comprising:
   a marking head for printing a mark in a mark position on the tire after undergoing the test by the tire testing machine, the mark being based on a result of the test performed by the tire testing machine;
   a sequence of a plurality of tire conveyance devices for conveying the tire after undergoing the test by the tire testing machine to the marking head;
   a tire detector installed in a position in a width direction of the tire perpendicular to a conveyance direction of the tire by the sequence of the tire conveyance devices so as not to interrupt the tire, the tire detector being adapted to detect the tire conveyed to the marking device after the test by the tire testing machine; and
   a control unit configured to control movement of the tire conveyance devices to stop the tire when the mark position on the tire is aligned with a print position, the print position being based on a conveyance distance from an installing position of the tire detector and information on the tire in a radial direction.

2. The marking device according to claim 1, wherein the tire detector is installed at the tire conveyance device passing through the marking head among the sequence of the tire conveyance devices.

3. The marking device according to claim 1, wherein the tire detector is installed in the print position in the conveyance direction of the tire by the sequence of the tire conveyance devices.

4. The marking device according to claim 1, wherein the tire detector is installed in a position on an upstream side with respect to the print position in the conveyance direction of the tire by the sequence of the tire conveyance devices, and
   wherein the control unit is adapted to decrease a conveyance speed of the tire after the tire detector detects the tire.

5. The marking device according to claim 1, wherein the tire conveyance device is a belt conveyer.

6. The marking device according to claim 1, wherein the tire detector is a laser sensor.

7. The marking device according to claim 6, wherein the tire detector is installed to have a scanning direction thereof forming an angle with respect to a tire conveyance surface.

* * * * *